United States Patent

Larrison

[15] 3,657,790
[45] Apr. 25, 1972

[54] APPARATUS FOR HANDLING AND BONDING FLIP-CHIPS TO PRINTED CIRCUIT SUBSTRATES

[72] Inventor: John E. Larrison, Costa Mesa, Calif.
[73] Assignee: Hughes Aircraft Company, Culver City, Calif.
[22] Filed: Apr. 2, 1969
[21] Appl. No.: 812,701

[52] U.S. Cl. ................................29/203, 29/208, 29/592, 228/4, 228/8
[51] Int. Cl. ..............................................................H01r
[58] Field of Search ................29/200, 203, 208, 592; 228/4, 228/8

[56] References Cited

UNITED STATES PATENTS

| | | | |
|---|---|---|---|
| 3,516,141 | 6/1970 | Rech | 29/203 |
| 3,491,425 | 1/1970 | McConnell et al. | 29/203 |
| 3,477,630 | 11/1969 | Schneider | 228/8 X |
| 3,337,941 | 8/1967 | Drop | 29/211 X |
| 3,316,382 | 4/1967 | Shumaker et al. | 228/8 X |
| 3,067,496 | 12/1962 | Rayburn | 29/203 |

Primary Examiner—John F. Campbell
Assistant Examiner—R. J. Craig
Attorney—W. H. MacAllister, Jr. and Paul M. Coble

[57] ABSTRACT

Apparatus and method for mechanically handling flip-chips in the course of bonding a plurality of flips-chips to a common substrate. The apparatus system includes an indexible carrousel having carrier magazines associated with slide transport and bonding mechanisms. The method includes mechanical handling of successive flip-chip loaded carriers in a manner that preserves an initial preorientation of the flip-chips in the course of transferring respective loaded carriers from selected magazines, separating the flip-chips from the associated carriers, transporting the flip-chips, and subsequently bonding the electrodes of the flip-chips to complementary contact areas on a printed circuit substrate.

11 Claims, 20 Drawing Figures

Fig. 1.

John E. Larrison,
INVENTOR.

APPARATUS FOR HANDLING AND BONDING FLIP-CHIPS TO PRINTED CIRCUIT SUBSTRATES

The present invention, in general, relates to apparatus and method for placing a plurality of similar or dissimilar microminiature elements on a common base member with the individual elements being located at specific predetermined locations on the surface of the base member and being oriented in a predetermined fashion relative to the orientation of the base member.

The present invention specifically relates to apparatus and method for assembling semiconductor elements such as flip-chips onto printed circuit substrates. More particularly the present invention relates to the bonding of electrodes of respective semiconductor flip-chip devices to corresponding complementary contact areas formed on a printed circuit substrate.

For purposes of illustration, the present invention will be described hereinbelow with reference to the bonding of the bump electrodes of respective flip-chips to corresponding contact areas on a printed circuit substrate, nevertheless, it will be readily appreciated that the present invention may be readily modified to accomplish the bonding of beam leaded chips to the printed circuit substrate. Additionally, the apparatus afforded by the present invention is generally susceptible of utility in assembly operations wherein a plurality of preoriented microminiature items are to be precisely placed at particular locations on the surface of a larger, common base member.

As is known, a printed circuit substrate generally comprises a dielectric substrate having a printed circuit formed thereon. Modern technology has seen increasing use of microelectronic circuits of the type wherein numerous microminiature circuit elements are attached to a common printed circuit substrate. It will be increasingly commonplace to see microelectronic circuit applications wherein large numbers of component chips are attached to a common printed circuit substrate. Micorcircuit substrates having as many as 40 chips bonded thereto will not be unusual. This situation poses the problem of being able to successfully handle the extremely small components or devices such as semiconductor diodes, triodes, or the like which are to be attached or bonded to the substrate. It can readily be appreciated that a strong requirement exists for bonding equipment or apparatus capable of handling numerous chips in expeditious, convenient, and rapid fashion during bonding to a common printed circuit substrate. The magnitude of the technological problems involved in the production of such microcircuits will be appreciated when one considers the necessity that respective chips be bonded to respective locations on the substrate with a relative orientation thereto such that the electrodes of the chip are aligned in opposing register with corresponding contact areas on the substrate.

In the specific application illustrated herein, semiconductor components of the flip-chip variety are provided wherein the respective flip-chips are particularly adapted for handling by apparatus provided in accordance with the present invention as will become more readily apparent hereinafter. These flip-chips have a set of bump electrodes on a major face thereof which are to be ultrasonically bonded to a complementary matching set of contact areas located on the substrate. To bond the flip-chip electrodes to a particular set of contact areas, the flip-chip must be brought into alignment with the substrate location containing the corresponding set of contact areas so that the respective flip-chip electrodes are in opposing register with the respective contact areas of the set.

Heretofore, microcircuits or printed circuits generally of the type with which the present invention is concerned have been produced by various techniques. Thus, for example, microcircuits have been produced by successively feeding respective randomly oriented chips from a vibratory feeder bowl to a bonding nozzle. The bonding nozzle transports each chip to a position overlying the substrate area to which the chip is to be bonded. In this position, the bonding nozzle holding the chip is rotated through the requisite angle to align the electrodes of the chip with an underlying set of complementary contact areas on the substrate. Once the requisite chip orientation is obtained, the bonding nozzle descends onto the substrate to bond the electrodes to the corresponding contact areas with which the respective electrodes are registered.

Another technique for producing microcircuits involves the use of an indexible table having peripheral chip receiving pockets. Rotational indexing of the table successively moves consecutive pockets into alignment with a single chip placement mechanism. The chip placement mechanism places a preoriented chip into each pocket which has been indexed into position underneath the chip placement mechanism. Each chip placed on the indexing table is carried, as the table indexes, to a location where a mechanical bonding nozzle obtains the chip from its pocket and transfers the chip over a fixed path to a fixed spatial location coincident with a specific set of contact areas on a substrate to which the electrodes of the chip are to be bonded by the bonding nozzle.

In contradistinction to the aforementioned and other techniques for producing microcircuits, the present invention utilizes special carriers designed to hold individual components or flip-chips. These carriers, each containing or holding a respective component or flip-chip, are stacked in respective carrousel magazines in such fashion that the individual chips are oriented in a common direction related to the relative orientation which the flip-chips are to possess when bonded to the substrate. The common orientation of the respective flip-chips in each stack of carriers is maintained from the time the associated carrier is removed from its magazine to the time the flip-chip is positioned on the printed circuit substrate.

In the practice of the present invention, carriers are singularly taken from selected magazines, the carrier is separated from the flip-chip carried thereby, and the flip-chip alone is mechanically transported to a predetermined, fixed spatial location where it is picked up by a bonding nozzle which ultimately bonds the electrodes of the flip chip to the corresponding contact areas on the substrate. The handling of each flip-chip is performed in a manner that preserves the original preorientation thereof so that when the flip chip is placed on the substrate it possesses the desired orientation relative to the substrate. In other words, each flip-chip is handled so that the original chip preorientation is preserved whereby when the flip-chip electrodes are brought into contact with the substrate, the electrodes are automatically aligned in opposing register with corresponding substrate contact areas.

In accordance with the foregoing it is an object of the present invention to provide apparatus and method utilizable in assembling preoriented microminiature items or elements with a base member by placing items at particular locations on the base member.

An associated object of the present invention is to provide apparatus and method utilizable in attaching a plurality of preoriented microminiature items or elements to various locations on a common base member.

A principal object of the present invention is to provide mechanical bonding equipment capable of bonding numerous flip-chips to a common printed circuit substrate at a high rate.

Another object of the present invention is to provide bonding equipment including handling apparatus capable of preserving an original preorientation of respective flip-chips relative to the orientation of the substrate.

Still another object of the present invention is to provide bonding equipment useful in bonding the electrodes of preoriented chips to discrete locations on a common substrate.

In general, these and other objects of the present invention are accomplished by the utilization of apparatus including an indexible carrousel, a slide mechanism, a pantograph, a translatable table coupled to the pantograph, a bonding mechanism and other associated mechanical elements.

The apparatus provided in accordance with the present invention is shown in the accompanying drawings wherein.

Figure 1:
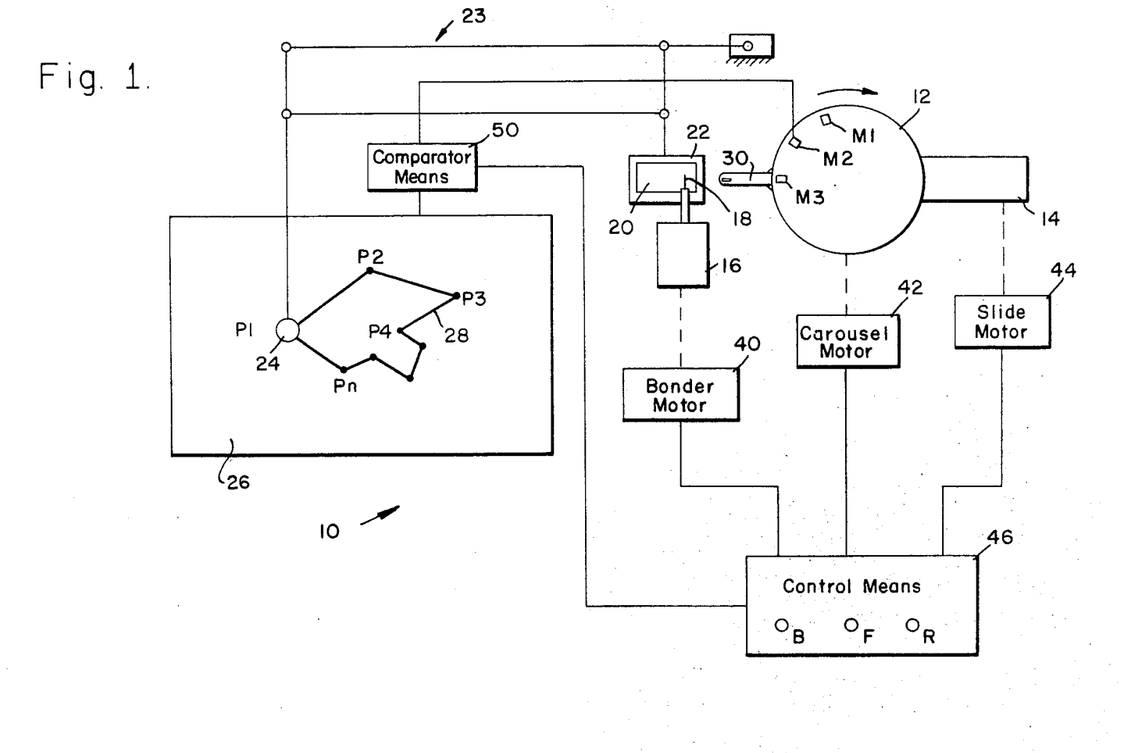
FIG. 1 is illustrative and diagrammatically depicts apparatus provided in accordance with the present invention.

The apparatus 10 diagrammatically shown in FIG. 1 includes indexible carrousel 12, slide transport mechanism 14, and bonding mechanism 16. The bonding mechanism 16 includes a vacuum bonding nozzle 18 aligned with a printed circuit substrate 20 positioned on a translatable table 22. The substrate 20 is oriented on table 22 and held in position by suitable means such as clamps or a recessed table pocket dimensioned so that the substrate 20 is precisely located, oriented, and nested therein. A conventional microscope (not shown) including a reticle is rigidly positioned over the translatable table 22. The microscope is pointed at the particular area of the substrate 20 directly beneath the bonding nozzle 18 and focused for viewing. The substrate contact areas, located in this particular substrate area, to which respective bump electrodes of a flip-chip are to be ultrasonically bonded are aligned to the reticle and thereby fine aligned with the bonding nozzle 18 which is positioned on a vertical perpendicular to the substrate surface. The table 22 is connected by pantograph 23 to pantograph handle 24 so that the location of pantograph handle 24 determines the position of substrate 20 relative to bonding nozzle 18. Handle 24 is shown located in position P1 on template 26 whereby a corresponding first location on substrate 20 is aligned with bonding nozzle 18.

The template 26 includes groove path 28 along which handle 24 is movable. The path 28 has a series of template apertures, herein labelled P1, P2, P3 . . . PN, located at points corresponding to substrate locations at which flip-chips are to be bonded. The handle 24 contains a light (not shown) which passes light rays onto individual photocells (not shown) underlying the respective apertures. This light-photocell arrangement serves a purpose to be explained hereinafter. Each aperture is slightly larger than the portion of handle 24 riding in path 28 to allow fine alignment of substrate position relative to bonding nozzle 18. If tolerances allow it may be possible to utilize smaller apertures in lieu of such slightly larger or oversized apertures and thereby eliminate the necessity of the fine alignment or adjustment of substrate position relative to the bonding nozzle 18.

Carrousel 12 includes magazines M1, M2, M3, . . . MN each containing carriers holding respective flip-chips to be bonded to substrate 20. The carriers holding the flip-chips are stored in the respective magazines so that each flip-chip is preoriented relative to the substrate location to which it is to be bonded. Typically, each flip-chip constitutes a semiconductor die having p-n junctions therein defining a diode, transistor, or the like. The flip-chips in a given magazine are identical in size and configuration with an identical arrangement of bump electrodes on a major face of the die. Carrousel 12 is rotatably indexible to bring selected magazines in radial alignment with reciprocable transport slide 30 of slide transport mechanism 14 so that a carrier holding a flip-chip may be removed by slide 30 from the magazine aligned therewith.

The bonding mechanism 16, carrousel 12, and slide mechanism 14, are respectively coupled to bonder motor 40, carrousel motor 42, and slide motor 44 and each is coupled to control means 46 which correlates the operation cycles thereof in a fashion to be described hereinafter.

The control means 46 may include bond, feed and repeat buttons, respectively labelled herein B, F, and R, which can be pressed by the individual operating apparatus 10. The control means 46 includes circuitry coupled to the buttons B, F, and R and to the respective mechanisms in such fashion that pressing the bond button B initiates, inter alia, movement of the bonding nozzle 18 from a rest elevation to a bond elevation and back. Pressing the feed button F results in carrousel indexing, slide 30 reciprocation involving movement from an intermediate position to a retracted position, then to an extended position, and back to the intermediate position, and associated nozzle 18 movement from the rest elevation to a pickup elevation and back. Pressing the repeat feed button R results in essentially the same movements resulting from pressing the feed button F except that carrousel indexing does not occur.

Comparator means 50 is coupled between carrousel 12 and pantograph 23 and further coupled to control means 46 and operates to compare the position of handle 24 with the index position of carrousel 12 so that a bonding cycle can be initiated only when the magazine aligned with slide 30 corresponds to the handle position so that bonding action may proceed only if the substrate location underlying bonding nozzle 18 is the location to which a flip-chip obtained from the aligned magazine is to be bonded. The fashion in which this is accomplished will become apparent hereinafter.

Figures 2, 3, 4, 5, 6, 7, 8, 9:
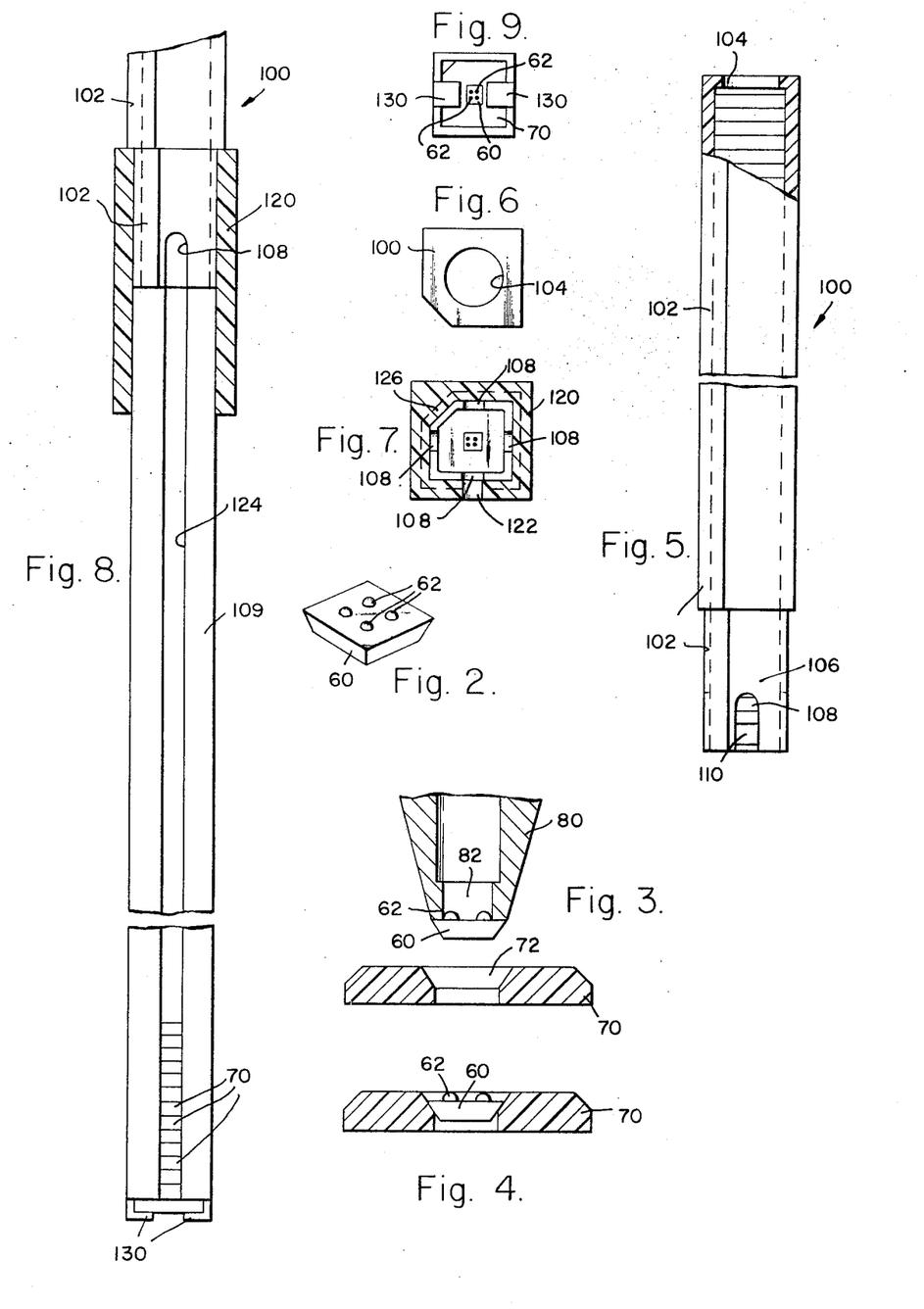
FIG. 2 shows a flip-chip of the type handled by the apparatus of the present invention.
FIG. 3 shows the manner in which the flip-chip of FIG. 2 may be placed in a carrier.
FIG. 4 shows the flip-chip mounted in the carrier.
FIG. 5 shows a storage tube containing a stack of chip-holding carriers.
FIG. 6 is a top view of the tube of FIG. 5.
FIG. 7 is a bottom view of the storage tube telescoped in a key tube showing the lowermost carrier in the tube holding a flip-chip.
FIG. 8 relates to the manner in which the tack of loaded carriers is transferred from the storage tube to a magazine.
FIG. 9 is a bottom view of the magazine shown in FIG. 8 showing the lowermost carrier in the magazine resting on magazine tangs with the flip-chip electrodes lowermost.

FIG. 2 shows a flip-chip 60 which resembles a truncated pyramid with bump electrodes 62 on the base thereof which is to be nested and held in a carrier 70 in the manner shown in FIG. 4. The four lateral sides of the flip-chip 60 are respectively inclined at an included constant angle of about 55° relative to the plane of the base of the pyramid. The opposed major faces of the flip-chip are square. The X and Y dimensions of the flip-chip are precisely determined and the electrodeless flip-chip face is precisely oriented and aligned with the bump electrodes 62 on the other major flip-chip face or base of the pyramid. Flip-chips, such as the one shown in FIG. 2, are inserted in respective carriers 70 by means of a vacuum nozzle 80 as shown in FIG. 3. Carrier 70 is basically square with one corner clipped off to provide theta orientation. Carrier aperture 72 includes a square lower portion and a pyramidal upper portion of complementary shape and size relative to the shape and size of flip-chip 60 as shown with the upper portion including four lateral sides respectively inclined at an included constant angle of about 125° relative to the plane of the top surface of carrier 70. Vacuum nozzle 80 includes a square aperture port 82 having X and Y dimensions sufficient to accommodate the bump electrodes 62 within the edges or border of the port 82 with only a slight clearance as shown. The flip-chip 60 is held by vacuum with the bump electrodes 62 nested within port 82 as the nozzle brings flip-chip 60 to carrier 70. The depth of the pyramidal upper portion of aperture 72 is such that when flip-chip 60 has been placed in carrier aperture 72 the bump electrodes 62 terminate below the adjacent or top face of carrier 70 as shown in FIG. 4. The flip-chip 60 in carrier 70 is precisely aligned and centered relative to the major dimensions of carrier 70.

Carriers 70 are generally of the type disclosed by the present applicant in U.S. Pat. No. 3,208,584, patented Sept. 28 1965, and assigned to Hughes Aircraft Company. The aforesaid patent discloses the utilization of an apertured carrier to hold semiconductor devices by force-fit during handling. In the present invention, this general type of carrier is employed to excellent advantage, however, it has been found that the flip-chips handled in the present invention need not necessarily be force fit into the carrier aperture. Instead, a dab of adhesive may be applied to the carrier aperture before the flip-chip is placed therein by nozzle 80. Liquid rosin flux may be utilized since the flip-chips, once bonded to the substrate in a manner to be described, are ultimately heated in a furnace to accomplish flux reflow. Regardless of the method used to place and hold a flip-chip in its carrier it is essential that the flip-chip be preoriented in its carrier and that this preorientation be preserved throughout the subsequent handling of the flip-chip.

Respective flip-chip loaded carriers are stacked in a storage tube 100 as shown in FIG. 5 for storage until such time as the loaded carriers are to be transferred into a magazine 109 shown in FIG. 8. Storage tube 100 (FIG. 5) comprises a four-sided tube of molded plastic having a bevelled or truncated corner 102, a central round aperture 104 at one end, a necked down length 106 at the other end, and a longitudinal slot 108 in each side of the necked down length 106. In order to stack loaded carriers into tube 100, the tube is held with aperture 104 lowermost and an elevator plunger (not shown) is inserted into aperture 104 until the end of the plunger inside the tube is adjacent the other tube end (shown lowermost in FIG. 5) which is open. Successive loaded carriers are placed into the open end and stacked upon the plunger which is progressively lowered within the tube. Since the tube 100 and carriers 70 have respective bevelled corners, the carriers can only be inserted into the tube with a designated common orientation. In the tube 100 the bump electrodes of the respective carrier held flip-chips all face toward the aforementioned open end.

In order to transfer loaded carriers into magazine 109 the tube 100 is held with aperture 104 uppermost. Flat rod 110 is employed as shown in FIG. 5 to prevent the loaded carriers from falling out of the tube. Carrier transfer is accomplished by partially telescoping key tube 120 onto the open top end of four-sided magazine 109. Key tube 120 has a longitudinal slot 122, extending between opposite end thereof, which is aligned with longitudinal magazine slot 124. Key tube 120 also has an internal rib 126 in a selected corner which extends from the top of the key tube halfway to the bottom of the key tube. When key tube 120 is telescoped onto magazine 109, the rib 126 rests upon the top of magazine 109. The necked down length 106 of tube 100 is telescoped into the upper half of key tube 120 with the bevelled corner 102 of tube 100 aligned with rib 126 of key tube 120. Rod 110 is lowered into magazine slot 124 thereby allowing the stacked carriers to descend into magazine 109 until the lowermost carrier in the stack rests on the opposed magazine tangs 130 as shown in FIG. 9. Consequently, all flip-chips in magazine 109 have their bump electrodes lowermost and are commonly oriented. Respective magazines 109, corresponding to magazines M1, M2, M3 ... MN shown in FIG. 1, once loaded, are ready for use in dispensing flip-chip loaded carriers to the transport slide 30.

Figure 10:
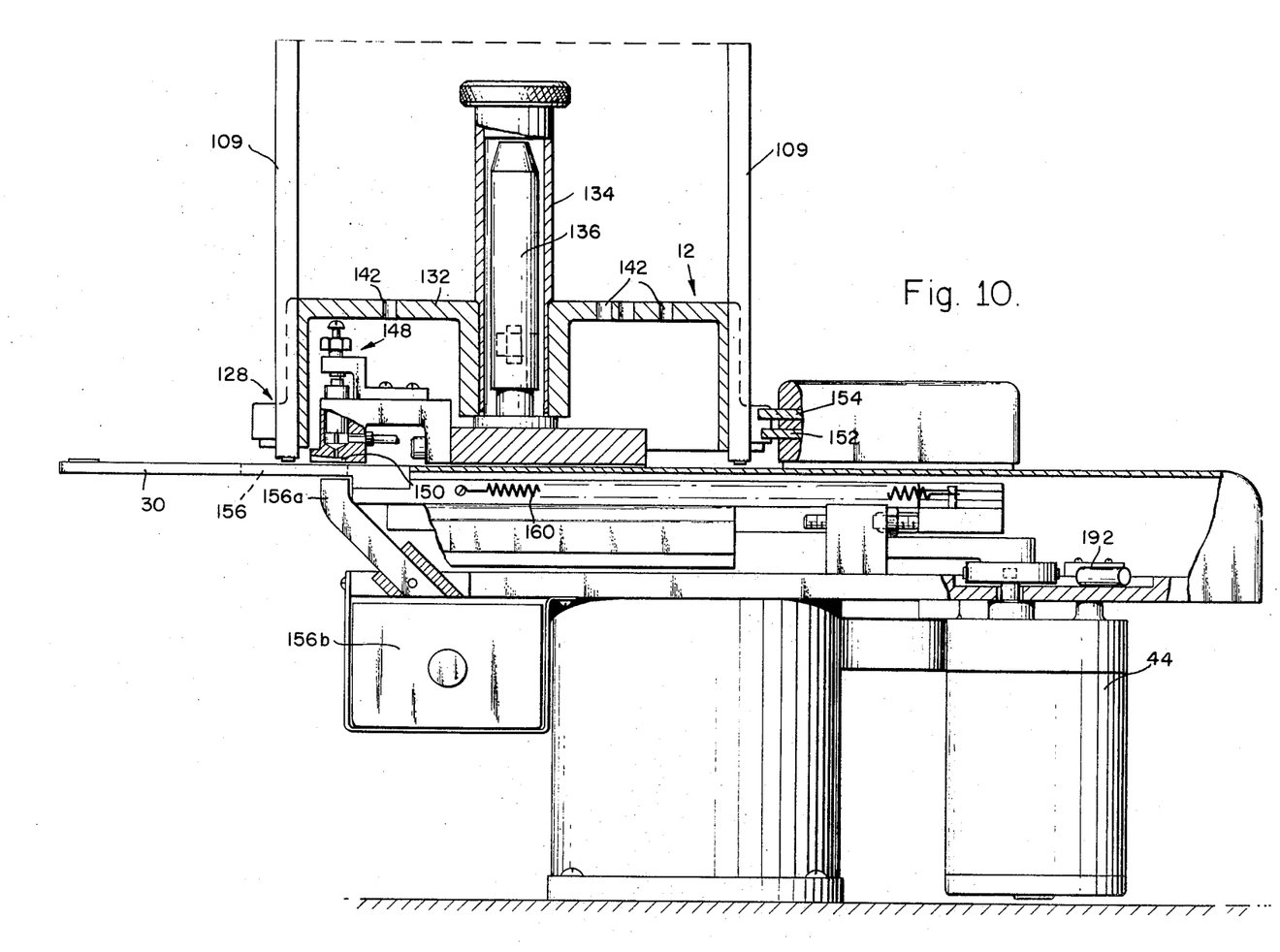
FIG. 10 shows an indexible carrousel, a slide mechanism, and associated elements.
Figure 11:
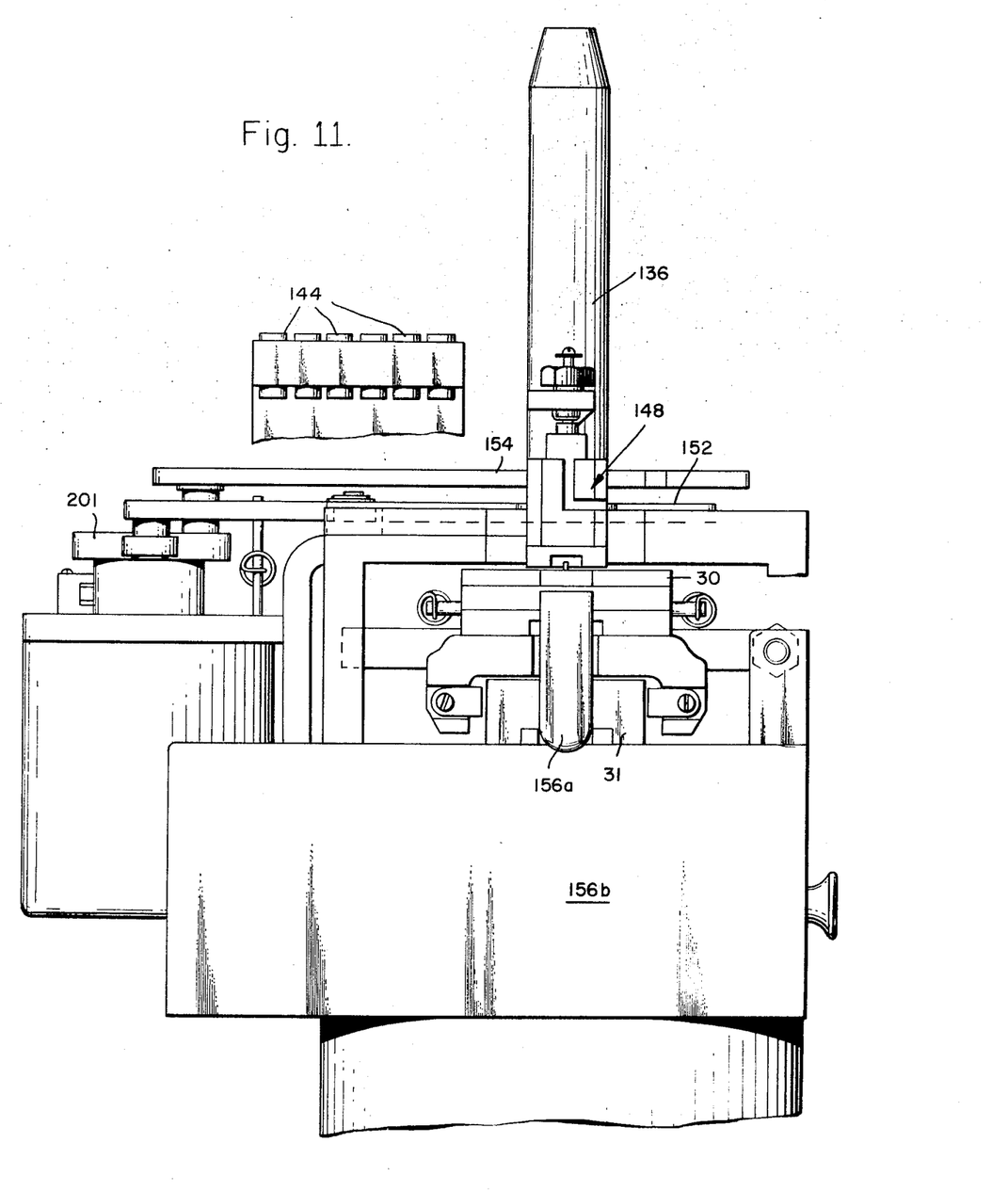
FIG. 11 is a front view of the slide mechanism of FIG. 10 and associated elements.
Figure 12:
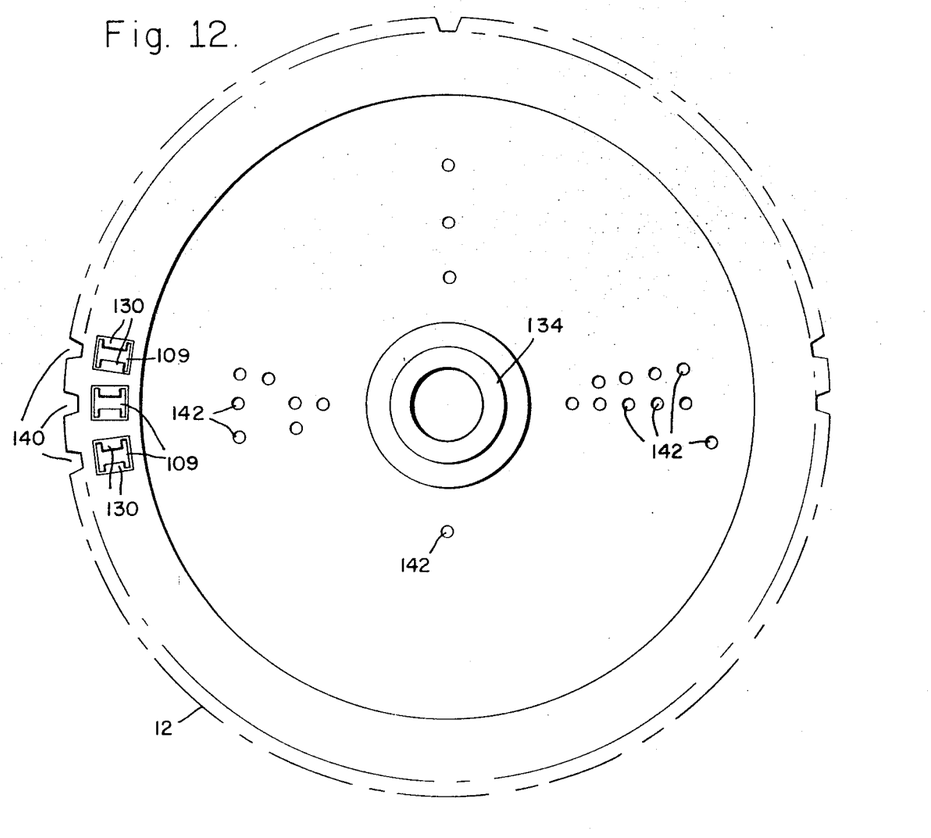
FIG. 12 is a bottom view of the carrousel shown in FIG. 10.

Referring now to FIGS. 10—13, carrousel 12 carries peripherally equispaced magazines 109 (only two magazines are shown in FIG. 10) cemented in respective carrousel apertures 128 in carrousel drum 132. Carrousel drum 132 is an annular inverted cup-like member having a central post sleeve 134 for mounting the drum on stationary centering post 136.

Magazines 109 are radially aligned with peripheral index notches 140 (FIG. 12) with opposed magazine tangs 130 on opposite sides of the radial line passing therethrough. Each magazine is identified by an associated group of radial binary code apertures 142. When magazine M1 is aligned with slide 30 code apertures 142 representing the indicia or number one are aligned with photocells 144 mounted beneath carrousel drum 132, and so forth. Solenoid plunger device 148 overlies a nest 150 (FIG. 10) in which a loaded carrier 70 can be lodged. Pawls 152 and 154 cooperate with notches 140 to index carrousel 12. Slide 30 has an aperture 156 (FIG. 13) through which carriers 70 may fall via tube 156A in the receptacle 156B (shown in FIG. 10).

Slide 30 (FIG. 13) is reciprocable back and forth between fully extended (shown), intermediate, and fully retracted positions. Spring 160 (FIG. 10) biases slide 30 toward the extended position. Scotch yoke 162 (FIG. 13) on slide 30 cooperates with roller 164 on crank arm 166 connected to slide motor shaft 168. Adjustable stop 170 determines the fully extended position of slide 30. Roller 164 rides along the front face of yoke 166 so that as clockwise crank arm rotation occurs the roller acts on the scotch yoke to slide the transport slide 30 on top of slide guide block 31 (FIG. 11) along a rectilinear path.

Figure 13:
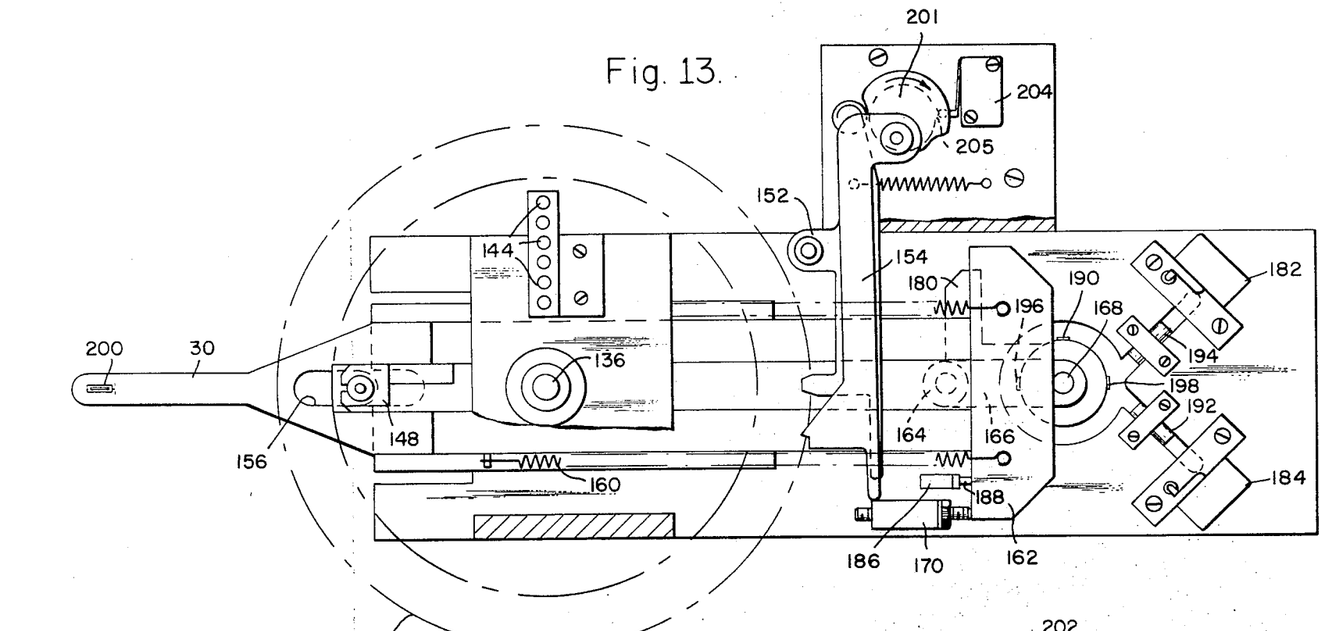
FIG. 13 is a plan view of the slide mechanism and FIG. 13a is an enlarged partial plan view of the associated slide.

Switch arm 180 (FIG. 13) leads crank arm 166 by 45° and cooperates with limit switches 182 and 184. Another limit switch 186 is stationarily mounted so as to be switchable when actuated by yoke mounted tab 188. Switch actuation occurs when slide 30 is fully extended as shown in FIG. 13. When crank arm 166 has rotated 90° clockwise from the position shown in FIG. 13, switch arm 180 actuates switch 182 at the same time that mirror 190 reflects light rays from light 192 to photocell 194. This concurrent condition results in the deenergization of slide motor 44, stopping slide 30 in the aforementioned intermediate position. When slide motor 44 is again reenergized, the crank arm rotates another 90° whereupon the next mirror 196 comes into alignment between the light and the photocell and switch arm 180 actuates the second switch 184. This latter concurrent condition results in the stopping of slide 30 in its fully retracted position. Subsequent reenergization of slide motor 44 occurs automatically after a predetermined time interval and results in an additional 180° rotation of crank arm 166 whereupon the next mirror 198 becomes aligned with the light and photocell, and tab 188 abuts switch 186. This concurrent condition results in slide motor 44 being again deenergized to stop the slide in its fully extended position as shown. The concurrent utilization of mirror alignment and switch actuation generally outlined performs various functions such as positively identifying the respective intermediate, retracted, and extended slide positions. Should, for example, the light-photocell circuitry malfunction consequential conditions arise which modify the apparatus operation from the simplified apparatus operation described herein.

In the intermediate slide position, the concurrent condition allows the carrousel motor 42 to be energized when desired to index carrousel 12 to align the next clockwise adjacent magazine 109 with slide 30. In the retracted slide position, the concurrent condition effects the operation of the plunger device 148 so that chip ejection from a carrier 70 on slide 30 can be accomplished. In the extended slide position, the concurrent condition effects the operation of the bonder motor 40.

Each time carrousel motor 42 is energized, cam 201 (FIG. 13) rotates clockwise a full 360° until cam boss 205 actuates limit switch 204 to deenergize and stop the carrousel motor. During this single cam revolution, pawls 152 and 154 connected thereto operate to clockwise index carrousel 12 to its next adjacent index position. To continue carrousel indexing until a selected magazine other than the next adjacent magazine is aligned with slide 30, the radial apertures 142 associated with the particular magazines to be bypassed are plugged with corks or the like. When the plugged apertures 142 align with the photocells 144, no comparison signal is sent comparator 50. In this case, carrousel motor 42 will automatically reindex carrousel 12 until a radial group of unplugged apertures comes into alignment with photocells 144 whereupon carrousel motor deactuation is accomplished by cam 201 and switch 204. Carrousel motor deactuation automatically results in slide movement from the intermediate position to the retracted position.

Figure 13A:
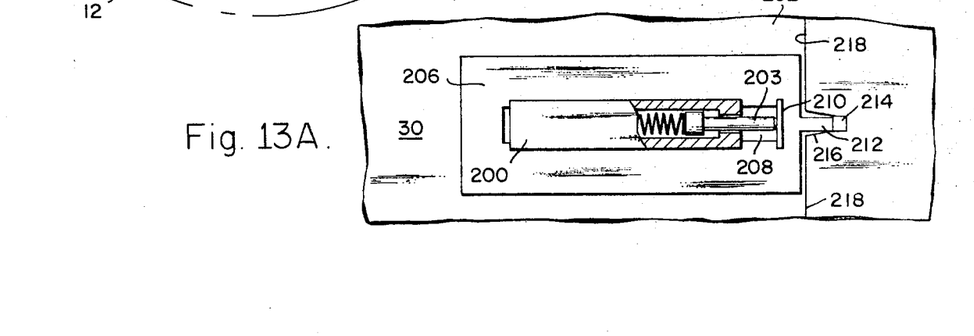

FIG. 13a is an enlarged plan view of the front end of slide 30 in the vicinity of key 200. Key 200 projects upward from recessed slide surface 202 and contains a plunger 203 outwardly spring biased toward the shown position. Sheet metal tongue 206 has a central longitudinal slot 208 centering the tongue about key 200. Vertical tongue tab 210 projects upward from the main portion of tongue 206 and is attached to plunger 203. The tongue 206, which is slidable on recessed slide surface 202, has a longitudinal tab 212 longitudinally aligned with a three sided chip receiving pocket 214 formed in the recessed slide surface. Pocket 214 is located at the end of a pair of opposed tapered guide walls 216 projecting from recessed surface 202 and is dimensioned so that a flip-chip 60 can be nested therein.

When plunger 203 is fully extended, the edges of tongue 206 flanking tab 212 abut vertical walls 218 on the slide and the edge of tab 212 is located adjacent the open side of pocket 214. As will become apparent hereinafter, when slide 30 is fully extended, tab 212 has pushed a flip-chip 60 (not shown) into pocket 214 to precisely locate the flip-chip relative to bonding nozzle 18. Also, when slide 30 is fully retracted, plunger 203 is fully retracted so that a flip-chip 60 may be ejected by plunger device 148 onto the recessed surface 202 at a location intermediate tab 212 and pocket 214. Subsequently, the tab 212 and tapered walls 216 cooperate to straighten, if necessary, and guide the ejected flip-chip into pocket 214 as tab 212 pushes the flip-chip into the pocket. The aforementioned procedure of ejecting a flip-chip from its carrier may be clarified with reference to FIG. 14 which shows the slide 30 in retracted position wherein chip loaded carrier 70 is located in nest 150 underneath solenoid operated plunger 148A prior to flip-chip ejection from carrier 70 which has previously been obtained from the magazine 102 aligned with slide 30.

Figure 14:
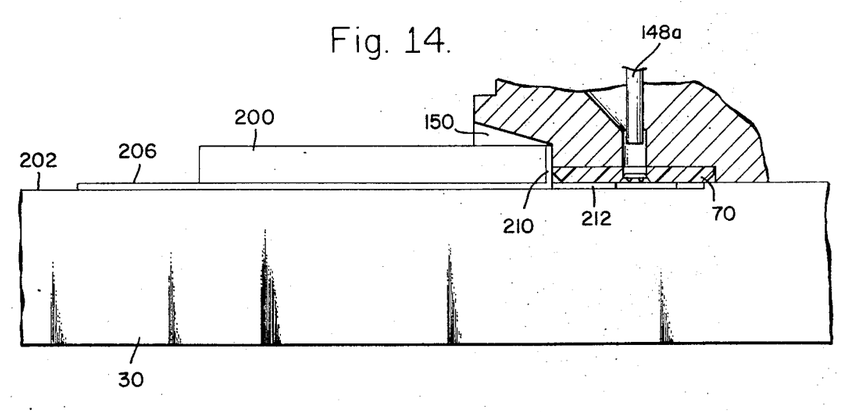
FIG. 14 shows a carrier on the slide prior to the separation of a flip-chip therefrom.
Figure 15:
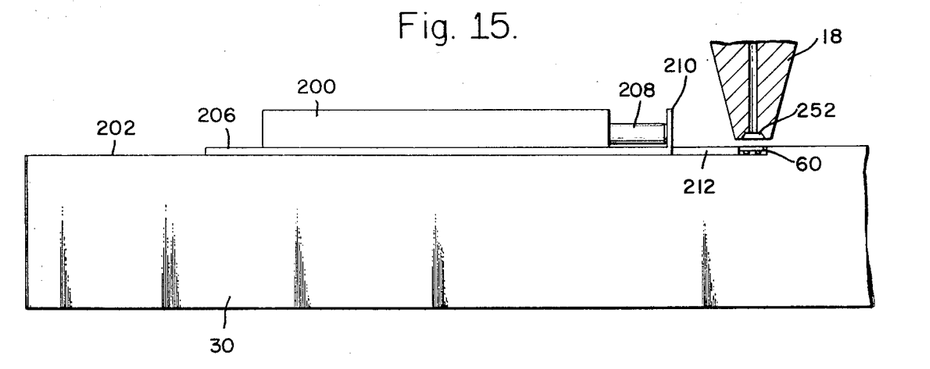
FIG. 15 shows the flip-chip in the slide prior to being picked up by the bonding nozzle of a bonding mechanism.
Figure 16:
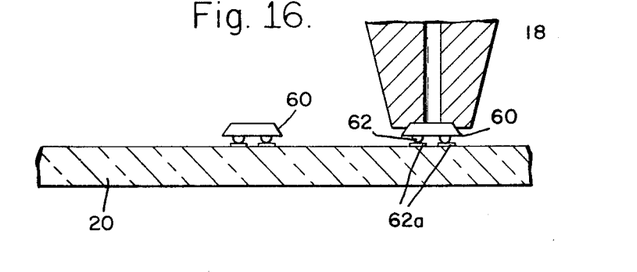
FIG. 16 depicts the bonding of a flip-chip to a printed circuit substrate.

FIGS. 14-16 illustrates various stages in the sequence of events involved in the separation of a flip-chip 60 from its carrier 70 and the bonding of the flip-chip to substrate 20. It may be reiterated that, in FIG. 14, slide 30 is retracted and chip-loaded carrier 70 is aligned with solenoid controlled plunger 148A. The carrier 70 is lodged in associated nest 150 and accurately located relative to the plunger. When plunger device 148 is actuated, upon the stopping of slide 30, plunger 148A descends and ejects chip 60 from carrier 70 onto recessed surface 202 of slide 30. After the chip has been ejected, slide 30 moves to its extended position, shown in FIG. 15, where bonding nozzle 18 moves down onto the chip, picks up the chip, and returns with the chip to its rest elevation. FIG. 15 shows the approach of bonding nozzle 18 to the chip. As can be seen in FIG. 15, the face of bonding nozzle 18 has a shallow recess 252 having a depth less than the thickness of the chip. The recess 252 is bevelled in accordance with the bevel of the chip, and the base of the recess has an area slightly larger than the base of the chip so that the chip is precisely positioned in bonding nozzle 18. The precise positioning of the flip-chip in nozzle recess 252 occurs as the result of body registration similar to the prior body registration of the flip-chip in the aperture 72 of carrier 70 and in the pocket 214 in slide 30. Bonding nozzle 18 subsequently bonds bump electrodes 62 on the lowermost face of the chip to the corresponding contact areas 62A on printed circuit substrate 20 as shown in FIG. 16. The final body registration of the flip-chip in nozzle recess 252 is sufficiently accurate that excessive misalignment of the bump electrodes 62 to contact areas 62A is virtually precluded with attendant savings in rework. Flip-chip preorientation is preserved throughout the steps shown in FIGS. 14-16 while the shallow recess 252 prevents random, or inadvertent flip-chip rotation or skidding during the ultrasonic bonding performed in FIG. 16.

Figure 17:
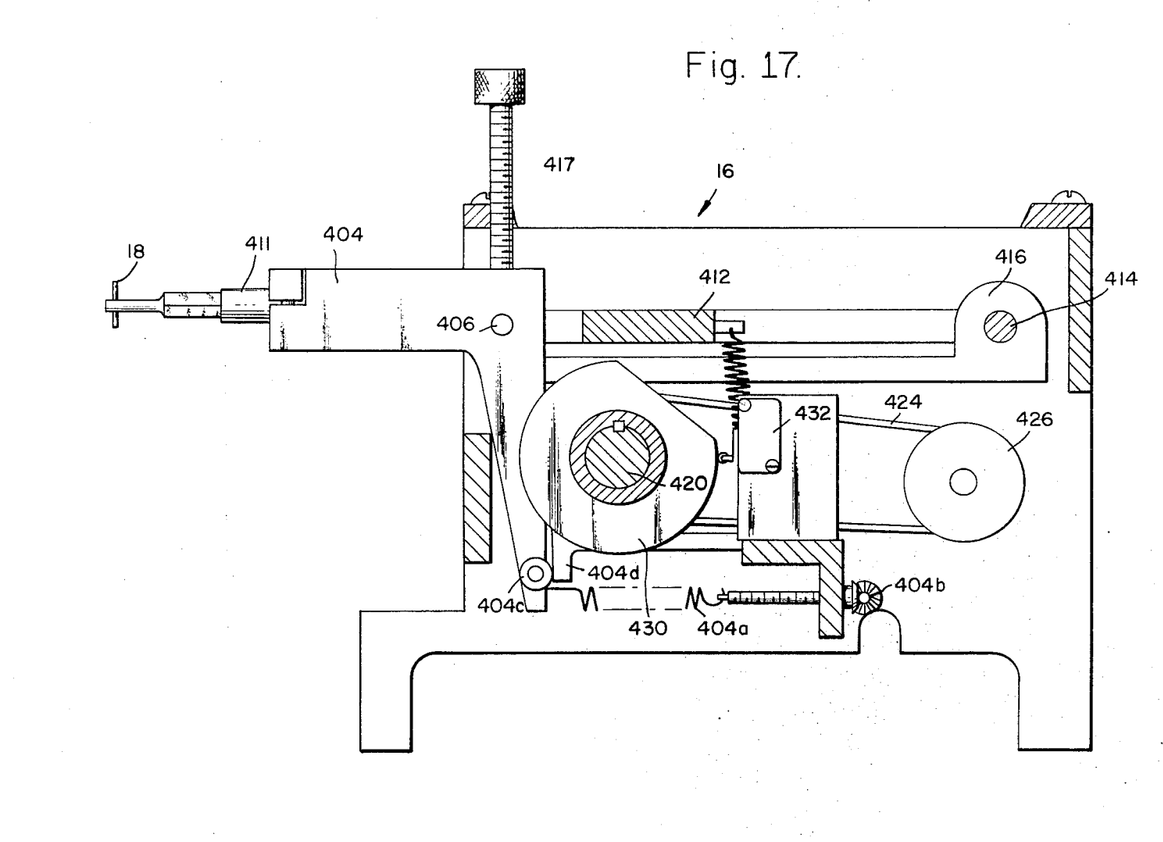
FIGS. 17, 18 and 19 are respective side, front and plan views relating to the bonding mechanism.
Figure 18:
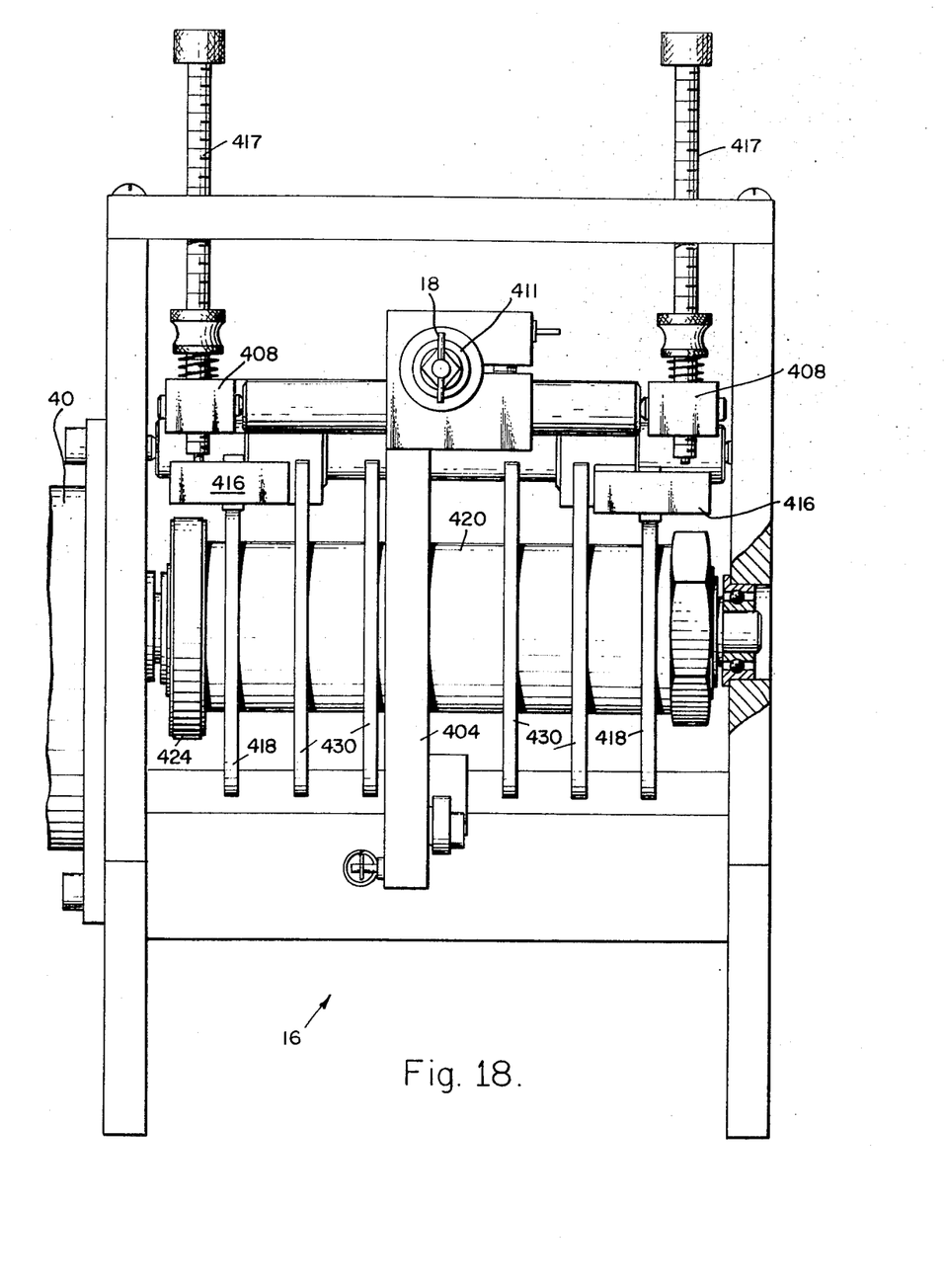
Figure 19:
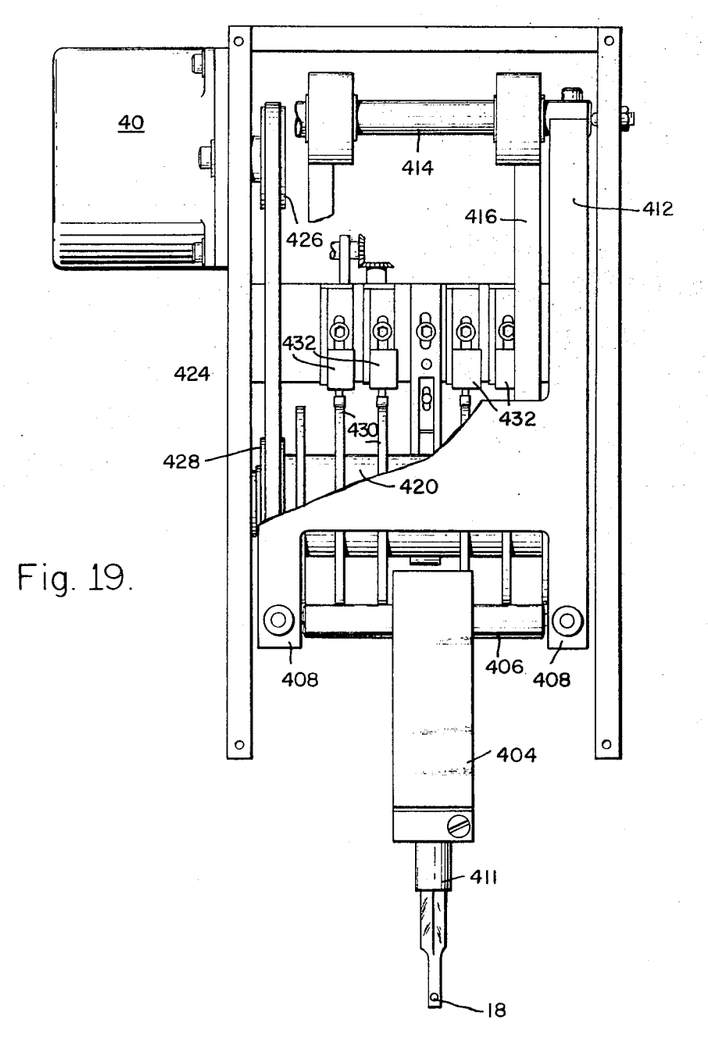

Referring now to FIGS. 17-19, bonding mechanism 16 comprises the vacuum bonding nozzle 18 supported in lever arm 404 pivoted on a shaft 406 which is mounted for rotation between the front arms 408 of H frame 410. An ultrasonic transducer unit 411 is mounted in lever 404 and is capable of transversely vibrating nozzle 18 at a high rate or frequency when ultrasonic bonding is to be performed by the nozzle 18. A spring 404A is connected between the lower or vertical arm of lever 404 and a rotatably adjustable screw 404B mounted in a frame to urge a roller 404C on the lower arm against the front vertical face of a stationary block 404D. By rotating the screw 404B the tension in spring 404A can be varied to allow any variation in the thickness of particular substrate 20 from a predetermined thickness. During ultrasonic bonding the roller 404C leaves or moves away from the front vertical face of block 404D as the bonding pressure or force involved in bonding a flip-chip to the substrate overcomes the spring tension force. The back arms 412 of the H frame (FIG. 19) are pivoted on bearing mounted shaft 414 so that the H frame may rotate about the axis of shaft 414. Levers 416, pivoted to shaft 414, extend beneath the H frame with the front ends of levers 416 resting on respective cams 418 (FIG. 18) mounted on cam shaft 420. The cam shaft 420 is coupled for rotation to bonder motor 40 by pulley belt 424 which is looped about drive pulley 426 and driven pulley 428 on cam shaft 420. Additional cams 430 (FIG. 18) on the cam shaft and associated limit switches 432 cooperate to control bonding mechanism operation.

When bonder motor 40 is energized, the pulley belt 424 rotates cam shaft 420 (clockwise in FIG. 17). The operation cycle of the bonding mechanism is such that when the bonder motor is energized the rotation of cams 418 lifts or lowers levers 416 to result in corresponding pivoting of H frame 410 about shaft 414. Rotatably adjustable stop screws 417 (FIG. 18) pass through threaded apertures in respective H frame front arms 408 to space the front arms 408 from the respective levers 416 by the length of the portions of the screws projecting downwardly from the bottom of the respective front arms 408. These stop screws 417 cooperate with levers 416 to determine the vertical position of the respective pickup and bond elevations of nozzle 18 and consequently also determine the vertical position of the nozzle rest elevation. The contour of cams 418 is such that, as the cam shaft rotates, lever 404 will move in a substantially vertical downward path to a chip pick up elevation. When nozzle 18 reaches the chip pick up elevation, one of the cams 430 actuates an associated switch 432 to turn off the bonder motor. When the bonder motor turns off, a resultant back electromotive force is electrically coupled to slide transport motor 44 to energize the slide transport motor to thereby move slide 30 from its extended to its intermediate position.

When the bonder motor is again energized, as by pressing a bond button, resultant cam shaft rotation occurs whereupon nozzle 18 descends to a bond elevation adjacent substrate 20. In the bond elevation, one of the cams 430 actuates an associated switch 432 to turn on the ultrasonic vibrator unit contained in lever 404 and to deenergize bonder motor 40. Ultrasonic bonding is performed, bonder motor 40 is automatically turned on and nozzle 18 returns to its rest elevation where a cam-limit switch turns off bonder motor 40. During the bonding action, the requisite bonding pressure to the interface between the bump electrodes 62 and associated contact areas 62A is provided by the nozzle 18. As mentioned previously, flip-chip preorientation is preserved throughout the steps shown in FIGS. 14-16 and the shallow nozzle recess 252 prevents random, or inadvertent flip-chip rotation during the ultrasonic bonding performed in FIG. 16.

Having thus described the various mechanisms comprising the apparatus 10, the operation thereof may be described as follows. The operator presses the feed button F. As a result carrousel 12 indexes. Thus, for example, magazine M1 is indexed out of alignment with slide 30 and magazine M2 is indexed into alignment therewith. When carrousel indexing is accomplished, slide 30 retracts and moves from its intermediate position to its retracted position. In the course of this movement a carrier 70 carrying a flip-chip is removed by ton- gue 206 and carried into nest 150. Plunger 148A pushes the flip-chip onto recessed slide surface 202 and stays in carrier aperture 72.

The slide 30 now moves forward until slide aperture 156 passes beneath carrier 70 whereupon carrier 70 falls via tube 156A into receptacle 156B. Slide 30 stops when it reaches the extended position. Bonding nozzle 18 descends onto the flip-chip in pocket 214. Vacuum is applied to the nozzle face. The flip-chip is picked up by the nozzle and is carried thereby to the nozzle rest elevation. Slide 30 returns to its intermediate position. The operator has previously moved or now moves to aperture P2 and as a result of the operation of comparator 50, a bonding operation can be performed when the operator presses the bond button B.

When the operator presses the bond button, the nozzle 18 descends to bond elevation whereupon the ultrasonic unit turns on and ultrasonic bonding of the bump electrodes to the aligned substrate contact areas occurs. The ultrasonic unit and the nozzle vacuum turn off and the nozzle returns to its rest elevation.

If it is found that the flip-chip has been lost, as may happen occasionally, so that bonding does not occur, or if the resultant bond is unsatisfactory then another bonding cycle may be initiated. If the latter instance, of course, the flip-chip is pried loose of the substrate before proceeding. In either event, the repeat feed button R is pressed to actuate bonder motor 44 through another cycle but not the carrousel motor 42. As a result of pressing the repeat feed button, the slide 30 removes another chip loaded carrier from the same magazine (M2 in this example). The flip-chip is separated from its carrier and, in the course of events, the flip-chip is transferred to the bonding nozzle. The nozzle carrying the new flip-chip ascends to its rest elevation to await the pressing of the bond button and the slide moves to its intermediate position.

Assuming, however, that the bond resulting from the previously described bonding operation is satisfactory, it will be apparent that the pantograph handle 24 can be repositioned in the next adjacent aperture position (P3) and the feed and bond buttons successively pressed to perform another bonding cycle.

Should it be desired to bypass certain aperture positions on the template for obvious reasons then the binary code apertures 142 associated with the magazines to be bypassed are plugged with corks as previously described. As a result of plugging these binary code apertures, the operation of cam 201 and limit switch 204 is overridden, as previously mentioned. In order to illustrate this feature, assume a flip-chip from magazine M1 has been bonded to the corresponding substrate location and it is now desired to bond a flip-chip to the substrate location corresponding to handle aperture position P4. In order to accomplish this task, the handle 24 is positioned in aperture position P4 and the binary code apertures associated with magazines M2 and M3 are plugged with corks.

The feed button is now pressed. Carrousel motor 42 indexes carrousel 12 to align magazine M2 with slide 30. Since the binary code apertures associated with magazine M2 are blocked, photocells 144 fail to send a comparison signal to comparator means 50. As a result, the cam 201-limit switch 204 arrangement is overridden as aforementioned and the carrousel indexes to align magazine M3 with slide 30. Once again, since the associated binary code apertures are blocked, the carrousel indexes to align magazine M4 with slide 30. Since the binary code apertures associated with and identifying magazine M4 are unblocked, the photocells 144 receive ambient light passing through the associated apertures 142. Consequently, comparison between the signals fed to comparator means 50 by photocells 144 and the photocell underlying the P4 aperture position allow the normal operation to occur so that carrousel 12 remains stationary with magazine M4 aligned with slide 30. Subsequent pressing of the feed button and bond button results in the completion of a bonding cycle in the usual manner.

While particular component parts of the invention have been shown and described, it will be understood by those skilled in the art that various changes in form and details may be made without departing from the spirit and scope of the invention.

What is claimed is:

1. In apparatus for placing individual items at selected locations on a common base member with each item specifically oriented relative to the base member orientation, the combination comprising:
   translatable support means for supporting an oriented base member being translatable to align respective selected locations on the base member with a fixed spatial reference point;
   plural magazine means each containing carriers with an item held by each carrier having a predetermined orientation relative to the base member orientation;
   means for acquiring a carrier from a selected magazine means;
   means for separating the item from the acquired carrier in such fashion that the predetermined orientation of the item is maintained; and
   means for transferring the separated item along a predetermined path to a selected location on the base member aligned with the reference point in such fashion that the item is placed on the base member at the selected location with the aforementioned specific orientation.

2. Apparatus for placing microminiature items on a member comprising:
   an indexible member;
   magazines attached to said indexible member;
   said magazines being respectively adapted to store loaded carriers each holding a respective microminiature item in a predetermined orientation;
   movable support means adapted to receive the aforementioned member which is oriented thereon;
   transfer means adapted to successively remove loaded carriers from selected magazines, separate the item from its carrier, and move the item to a spatial location coincident with a location on the member to place the item thereat;
   said transfer means including separation means for separating the item from its carrier and means for moving the item to said predetermined spatial location while preserving the orientation which the item possessed while held in its respective carrier;
   and actuator means for initiating a cycle of operation during which the aforementioned placement operation is performed.

3. In apparatus, for successively placing each of a plurality of consecutive chips on a substrate, the combination comprising:
   a first station for supplying chip-loaded carriers;
   a second station for separating the chips from the carriers;
   a third station including support means for supporting a substrate;
   transport means cooperable with said stations for transporting chip-loaded carriers from said first station to said second station and for transporting chips from said second station to said third station; and
   placement means at said third station cooperable with said transport means to transfer the chips to the substrate on the support means.

4. The apparatus set forth in claim 3 wherein said first station includes magazines containing the chip-loaded carriers.

5. The apparatus set forth in claim 4 including selecting means for selecting a magazine from which a chip-loaded carrier is to be obtained by said transport means.

6. The apparatus set forth in claim 1 further including:
   pantograph means coupled to said translatable support means for translating said translatable support means to accomplish the positioning thereof.

7. The apparatus set forth in claim 7 further including:
   template means having a pattern path; and a handle on said pantograph means movably positionable along said pattern path to effect positioning of said translatable means.

8. The apparatus set forth in claim 7 further including:
position identifying means at predetermined points along said pattern path related to predetermined positions of said translatable support means whereby positioning of said handle at a predetermined point is indicative of particular corresponding predetermined position of said translatable support means.

9. The apparatus set forth in claim 7 wherein said pattern path is a guide groove in which a portion of said handle may travel as said handle is moved along said pattern.

10. The apparatus set forth in claim 9 wherein said guide groove is notched at particular points along the groove path related to predetermined position of said translatable support means.

11. The apparatus set forth in claim 7 wherein said template means is apertured at predetermined points along said pattern path.

* * * * *